July 9, 1935.  L. KELLNER  2,007,250
GARBAGE PAIL
Filed Dec. 13, 1933
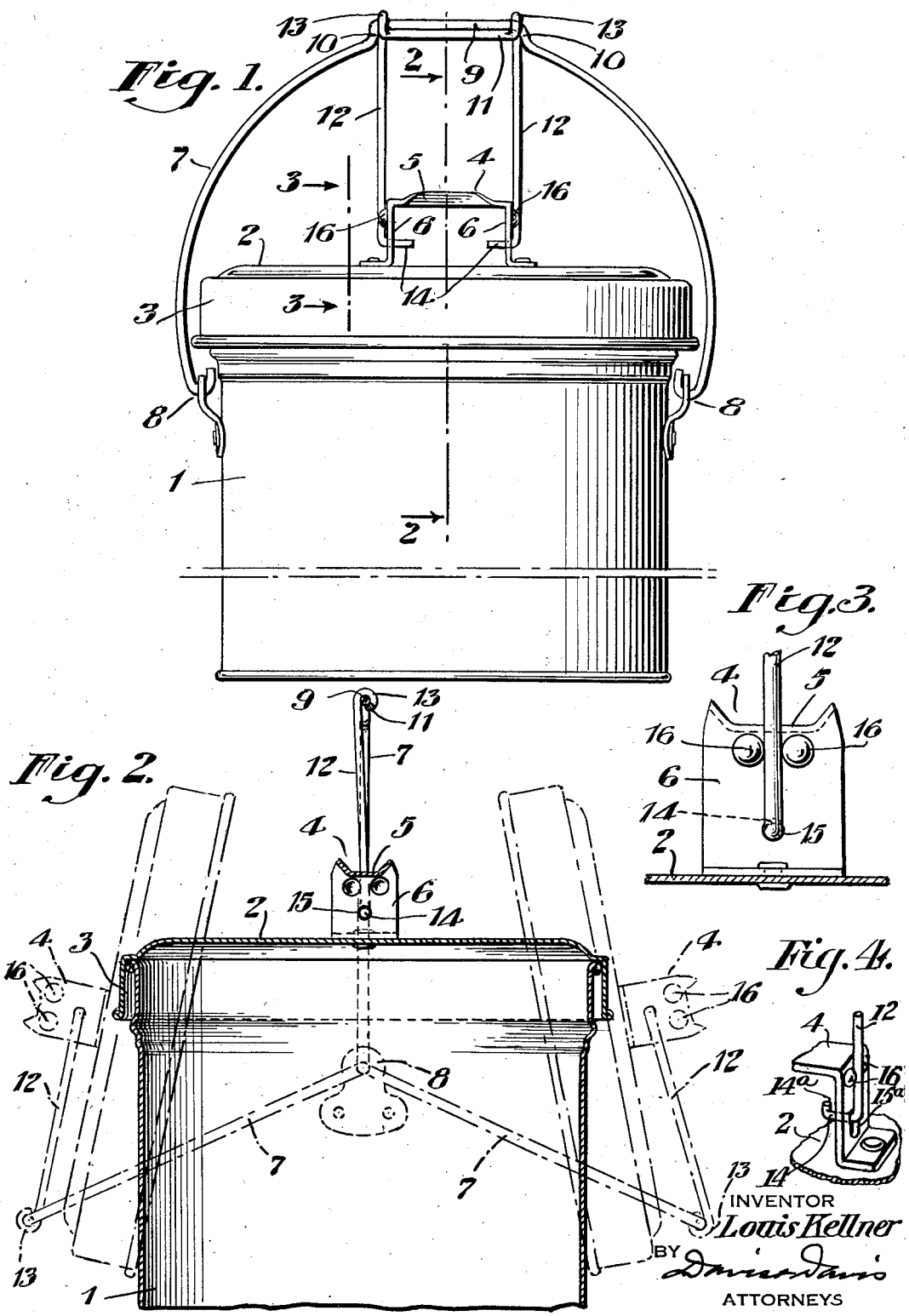
INVENTOR
*Louis Kellner*
BY
ATTORNEYS Patented July 9, 1935

2,007,250

UNITED STATES PATENT OFFICE 2,007,250

GARBAGE PAIL

Louis Kellner, Brooklyn, N. Y.

Application December 13, 1933, Serial No. 702,158

7 Claims. (Cl. 220—56)

The present invention relates more particularly to garbage pails or the like, provided with a lid or cover and a hinged lifting bail. An important object of the invention is to provide such a pail with improved means to shift the lid to open and closed positions by swinging the lifting bail, and to keep the lid constantly connected to the pail.

Other objects of the invention will appear hereinafter.

In the drawing, Fig. 1 is a side elevation of a pail equipped with the invention;

Fig. 2 is a section on the line 2—2 of Fig. 1, the lid being shown in open positions by dot and dash lines;

Fig. 3 an enlarged detail section on the line 3—3 of Fig. 1; and

Fig. 4 a detail perspective view of a modified form of one of the hinge connections in the linkage between the lifting bail and the lid.

The pail 1 is of a standard type and it has a removable lid or cover 2 with a depending annular flange 3. Said flange fits loosely over an external bead at the mouth of the pail. Below said bead the flange is spaced out of contact with the body of the pail to afford a desired clearance. At its center the lid has a rigid loop-shaped handle 4. The latter is formed of a sheet metal strap bent to form a horizontal grip portion 5, vertical side portions 6 spaced a substantial distance apart, and out-turned feet riveted or otherwise secured to the lid. The pail has a lifting bail 7 hinged thereto at diametrically opposite points, as at 8, to swing on a horizontal axis spaced below the lid flange. Said bail is formed of a wire strand and, at materially spaced medial points, it is bent to form a straight horizontal grip portion 9 and stop shoulders 10 at opposite ends of the grip portion. Between said grip portion of the lifting bail and the handle 4 of the lid there is an operative connection to shift the lid to open and closed positions by swinging the bail.

Said operative connection between the bail and the lid comprises a rather stiff and resilient wire strand bent into approximately inverted U form to provide a horizontal upper portion 11 close to the grip portion of the bail, and parallel depending leg portions 12. At the junctures of said horizontal portion with said leg portions the strand is curled to form eyes 13. The latter encircle the grip portion 9 of the lifting bail and thereby hinge the strand to the bail at points closely adjacent to the stops 10. At their lower ends the leg portions of the strand are provided with horizontally aligning journal portions 14 formed by bending the extremities of the strand inward in opposed relation. The leg portions closely straddle the lid handle 4, and the vertical sides of said handle have bearing apertures 15 rotatably receiving said journal portions of the strand. Thereby the legs of the strand are hinged to the lid handle.

In effect, the strand legs 12 form pull-and-thrust links hingedly connected to the lifting bail and to the lid handle on axes parallel with the hinge axis of the bail. When the bail is erect all three of said hinge axes are in the same vertical plane, or approximately so, and the links then hold the lid in closed position. Locking means are provided to yieldably hold the lifting bail erect. At its outer side each vertical portion of the lid handle 4 has a pair of spaced stop bosses 16 to closely receive the adjacent strand leg 12 therebetween and resist swinging of the strand. Said bosses are rounded in cross section so that when force is exerted upon the lifting bail to swing it the legs will yield laterally sufficiently to pass over the rounded bosses. When the lifting bail is swung back to erect position the legs yield to snap back into locked position between the bosses. The bosses may be formed as shown by pressing out the material of the lid handle.

When the lifting bail is swung in either direction from its erect position the strand legs or links 12 exert a pull on the lid handle to first lift the lid and then swing it to an open position at one side of the pail. The parts are so shaped and proportioned that the lid and the links cooperate to limit the outward and downward swing of the bail, and the lid and the bail mutually engage to support the lid in an inclined open position. In this position of the lid it rests against the periphery of the mouth of the pail and a portion of the pail mouth projects into the space surrounded by the lid flange, as shown in Fig. 2. Thus the lid is disposed in position for ready replacement to closed position without obstruction by the flange. The lid and the links cooperate to positively support the bail in this position so that the bail will in turn properly support the lid. The inwardly inclined lid bears against both the pail and the bail, and the pivotal connections of the bail 7 and links 12, with the pail and lid respectively, are widely spaced apart. Further downward swing of the bail is thereby resisted since the handle portion of the bail cannot swing on two spaced pivots and since the inclined lid is supported in a position of stable equilibrium to prevent downward shift of the links 12. The lid and bail are thus also disposed in position for convenient emptying of the pail. By grasping the bail grip and pressing upon it inward toward the pail and grasping the far bottom corner of the pail, the pail may be conveniently held in inclined or inverted position to empty it. By merely swinging the bail back to erect position the lid is replaced to closed position by the thrust of the links 12. By reason of the fact that the links are rather widely spaced the lid is held by the links against wobbling as it is shifted and while it is in open position.

When the pail is in service the lid remains constantly attached to the bail, and thereby to the pail, so that misplacement or loss of the lid is prevented. The lid may, however, be readily detached for cleaning or other purposes by merely spreading the springy links 12 sufficiently to withdraw the journals 14 from the bearing apertures 15. This detachability of the lid also enables the lid and the pail to be shipped separately and with the pail in nested relation to other larger or smaller pails.

Fig. 4 shows a modified form of the hinge connection between the links 12 and the lid of the pail. In this form each journal portion 14 has its inner extremity bent upward to form a retaining stop 14ª, and each bearing aperture 15ª is vertically elongated to permit said stops to be passed through them. Normally the journals are held at the upper ends of the apertures or slots 15ª by the connection of the links 12 with the lifting bail, and the stops 14ª positively prevent accidental detachment of the links from the lid handle 4. When the bail is lowered, however, the lid may be swung away from the side of the pail and into a position wherein the journal stops 14ª are in alignment with the slots 15ª. Then by spreading the links 12 the journals may be withdrawn from the slots to detach lid from the links. The journals are of sufficient length to permit spreading of the links to pass over the stops 16, without obstruction by the stops 14ª.

What I claim is:

1. In combination, a pail having a lifting bail hinged to opposite sides of the pail to swing on a horizontal axis extending approximately diametrically of the pail, a lid for the pail provided with an annular flange to fit over the top of the pail, and a pull and thrust linkage connection between the bail and the lid comprising a resilient wire strand bent into approximately an inverted U-form to provide a transverse upper portion and depending leg portions, said transverse upper portion being hinged to the central portion of the bail and said leg portions having their lower extremities bent into endwise aligning relation to form journals, a pair of bearings on the central portion of the lid receiving said journals to provide a hinge connection on a horizontal axis spaced above the axis of the bail hinge, to shift the lid to an open position at one side of the pail by swinging the bail downward and to shift the lid to closed position by swinging the bail upward, the bail and lid being mutually engageable to support the lid in an inclined open position at one side of the pail with the lid rested against an upper portion of the pail and with said upper portion of the pail projecting into the space surrounded by the lid flange, and said journals being retractible from their bearings by flexing the strand, to detach the lid from the bail.

2. In combination, a pail having a lifting bail hinged to opposite sides of the pail to swing from an erect position to lowered positions at opposite sides of the pail on a horizontal axis extending approximately diametrically of the pail, a lid for the pail, a pull-and-thrust linkage connection between the bail and the lid comprising a resilient wire strand bent into approximately an inverted U-form to provide a transverse upper portion and depending leg portions, said transverse upper portion being hinged to the central portion of the bail and said leg portions having their lower extremities bent into endwise aligning relation to form journals, a pair of bearings on the central portion of the lid receiving said journals to provide a hinge connection on a horizontal axis spaced above the axis of the bail hinge, to shift the lid to open position by swinging the bail in either direction from its erect position and to shift the lid to closed position by swinging the bail to its erect position, and fixed spaced locking projections carried by the lid to receive one of said leg portions of the strand therebetween to yieldably lock the bail in erect position, said projections being formed to flex said leg portion to pass thereover in either direction by forcibly swinging the bail.

3. In combination, a pail having a lifting bail hinged to opposite sides of the pail to swing on a horizontal axis extending approximately diametrically of the pail, a lid for the pail, and a pull-and-thrust linkage connection between the bail and the lid comprising a resilient wire strand bent into approximately an inverted U-form to provide a transverse upper portion and depending leg portions, said transverse upper portion being hinged to the central portion of the bail and said leg portions having their lower end portions bent into endwise aligning relation to form journals and also bent upward to form retaining stops at the free extremities of the journals, a pair of bearings on the central portion of the lid receiving said journals to provide a hinge connection on a horizontal axis spaced above the axis of the bail hinge, to shift the lid to an open position at one side of the pail by swinging the bail downward and to shift the lid to closed position by swinging the bail upward, the apertures of said bearings being vertically elongated to receive said stops therethrough and said journals being normally held at the upper end of said apertures with said stops out of alignment with the apertures by the connection of the linkage with the bail, and the lid being shiftable to an open position wherein said apertures are in full alignment with the stops to permit withdrawal of the journals from the bearings and detachment of the lid from the assembly by flexing the leg portions of the strand.

4. In combination, a pail having a lifting bail hinged thereto to swing between an erect position and a lowered position at one side of the pail, a lid for the pail having an annular flange to fit over the top of the pail, and a pull-and-thrust linkage connection pivoted at one end to the lid and at its opposite end to the bail and with its pivot axes parallel to the hinge axis of the bail and spaced apart a distance less than that between the hinge axis and the pivotal connection between the bail and the said linkage, to shift the lid to open position at one side of the pail by swinging the bail downward and to restore the lid to closed position by swinging the bail back to erect position, said bail, lid and linkage connection being cooperable to limit downward swing of the bail, and the bail and lid being mutually engageable and being cooperable with said linkage to dispose and support the lid in an upwardly and inwardly inclined open position with the lid resting laterally against an upper portion of the pail at a point within said flange and resting downward on the bail at a lower point and with the downward movement of the bail limited by the linkage and its connection with the inclined lid.

5. In combination, a pail having a lifting bail hinged thereto to swing between an erect position and a lowered position at one side of the pail, a lid for the pail, and a pull-and-thrust linkage connection pivoted at one end to the lid and at its opposite end to the bail, to shift the lid to open position at one side of the pail by swinging the bail downward and to restore the lid to closed position by swinging the bail back to erect position, said bail, lid and linkage connection being cooperable to limit downward swing of the bail, and the bail and lid being mutually engageable and being cooperable with said linkage to dispose and support the lid in an upwardly and inwardly inclined open position with the lid resting laterally against an upper portion of the pail and resting downward on the bail at a lower point and with the downward movement of the bail limited by the linkage and its connection with the inclined lid.

6. In combination, a pail having a lifting bail hinged to the pail to swing between an erect position and a lowered position, a lid for the pail, a pull-and-thrust linkage connection between the bail and the lid comprising a flexible and resilient member of approximately inverted U-form to provide a transverse upper portion and depending leg portions, said transverse upper portion being hinged to the central portion of the bail and said leg portions having their lower extremities laterally disposed in endwise aligning relation to form journals, and a pair of bearings on the lid receiving said journals to provide a hinge connection on a horizontal axis parallel to the bail hinge axis, to shift the lid to open and closed position by swinging the bail, said journals being retractible from their bearings by flexing the linkage member.

7. In combination, a pail having a lifting bail hinged to the pail to swing between an erect position and a lowered position, a lid for the pail, a pull-and-thrust linkage connection between the bail and the lid comprising a flexible and resilient member of approximately inverted U-form to provide a transverse upper portion and depending leg portions, said transverse upper portion being hinged to the central portion of the bail and said leg portions having their lower extremities laterally disposed in endwise aligning relation to form journals, a pair of bearings on the lid receiving said journals to provide a hinge connection on a horizontal axis parallel to the bail hinge axis, to shift the lid to open and closed position by swinging the bail, said journals being retractible from their bearings by flexing the linkage member, and cam-like stop means borne by the lid and engageable by said linkage member to hold the latter and the bail in erect position, the linkage member being yieldable by flexure, upon forcible swinging of the bail, to ride over said stop means to and from erect position.

LOUIS KELLNER.